(No Model.) 2 Sheets—Sheet 1.
R. L. AYER.
MECHANICAL MOVEMENT.
No. 395,415. Patented Jan. 1, 1889.
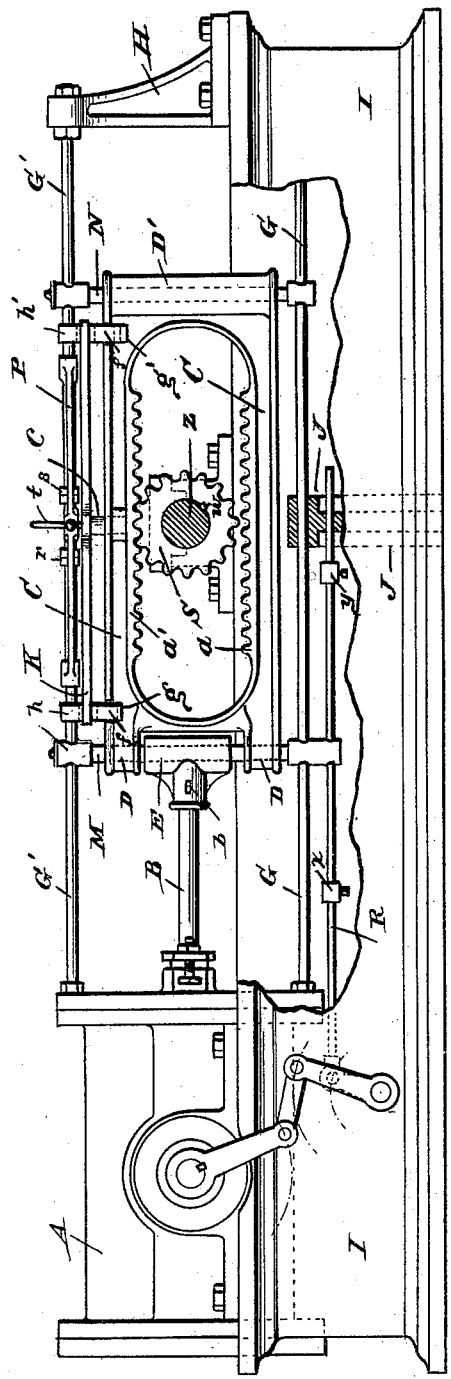
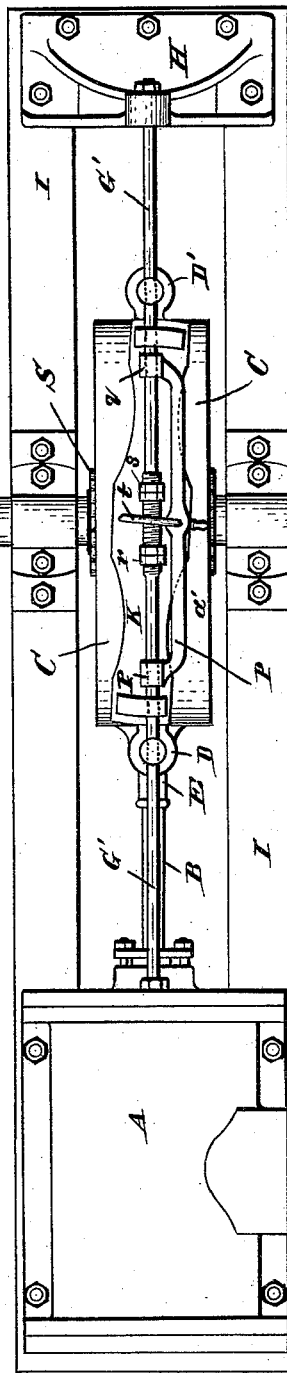
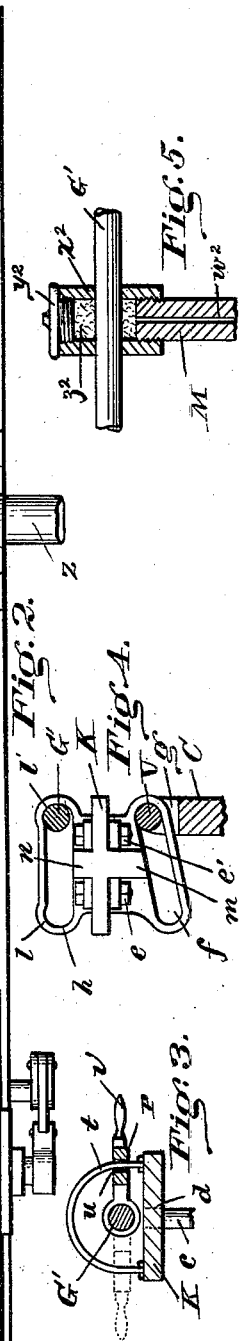
Attest.
C. W. Bogart.
David Davis.
Inventor:
Richard L. Ayer,
by Chester W. Merrill,
Atty.

(No Model.) 2 Sheets—Sheet 2.

R. L. AYER.
MECHANICAL MOVEMENT.

No. 395,415. Patented Jan. 1, 1889.

Attest.
C. W. Bogart
David Davis

Inventor:
Richard L. Ayer,
by Chester W. Merrill,
Atty.

UNITED STATES PATENT OFFICE.

RICHARD L. AYER, OF CINCINNATI, OHIO.

MECHANICAL MOVEMENT.

SPECIFICATION forming part of Letters Patent No. 395,415, dated January 1, 1889.

Application filed July 16, 1888. Serial No. 280,152. (No model.)

*To all whom it may concern:*

Be it known that I, RICHARD L. AYER, a citizen of the United States, residing at Cincinnati, Hamilton county, Ohio, have invented new and useful Improvements in Mechanical Movements, of which the following is a specification.

My invention relates to mechanical movements, and its object is to provide a better means of converting what is known as "reciprocating motion" into rotary motion or the opposite. This is now usually accomplished by means of a crank. As is well known, a serious objection to the use of a crank has always been found in the fact that the whole power which causes the motion of the crank cannot be utilized except during a small portion of the revolution of the crank and its shaft. In my invention the reciprocating body is made to act directly upon a revolving wheel and the transmission of power is direct. I accomplish this by attaching to the body moving with a reciprocating motion two parallel racks which are arranged to pass on either side of a toothed wheel in the plane of its teeth, and by certain additional mechanism by which the teeth of the wheel are engaged during one portion of the reciprocating movement with the teeth of one of the racks and during the other portion of the movement with the teeth of the rack upon the opposite side of the wheel.

Mechanism embodying my invention is illustrated in the accompanying drawings, in which—

Figure 6:
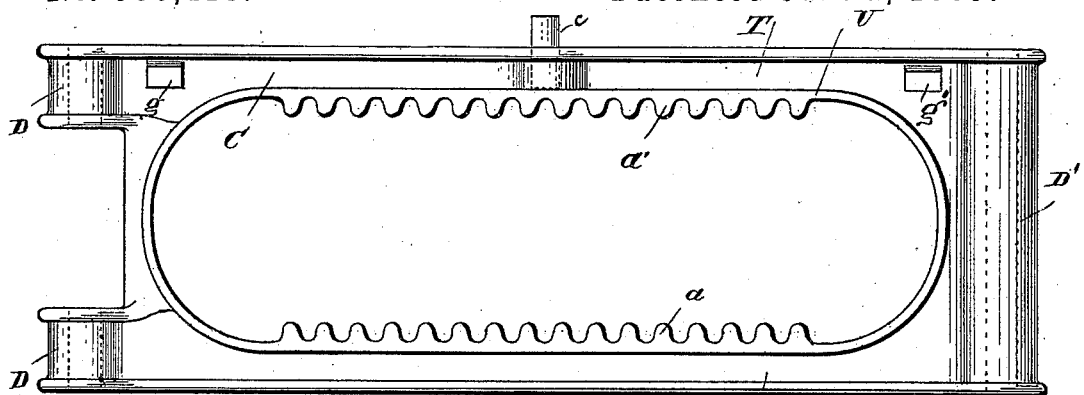
Figure 7:
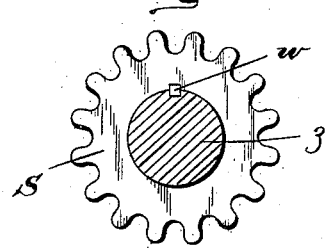
Figure 10:
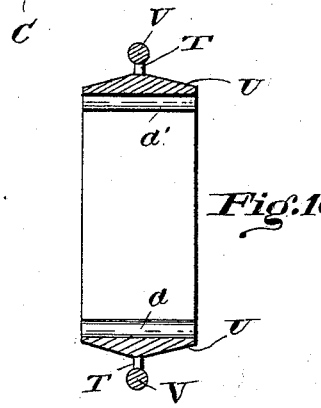
Figure 8:
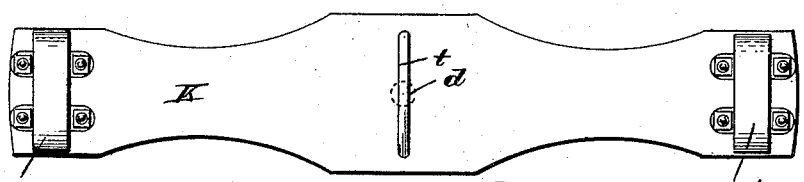
Figure 9:
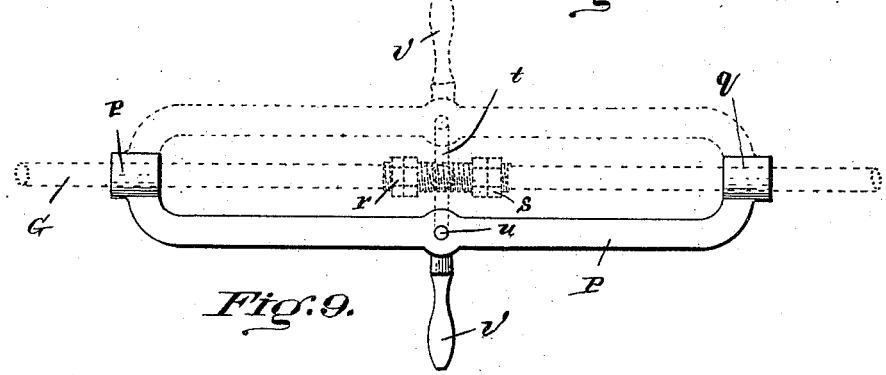

Figure 1 is an elevation of the device, with the wheel and racks and a portion of the mechanism shown in section. Fig. 2 is a plan view of the same device as seen from above. Fig. 3 is a cross-section showing the shifting-bar and connecting-bar and their attachment to the pin and the guide to the connecting-bar. Fig. 4 is a cross-section of the end of the shifting-bar at the point of its attachment to the rack-frame and to the supporting-rod. Fig. 5 shows a longitudinal section of one of the cross-heads and its connection with the supporting-rod. Fig. 6 is a detached elevation showing the rack-frame with the parallel racks. Fig. 7 is an elevation of the toothed wheel, showing also its attachment to its shaft. Fig. 8 is an elevation of the shifting-bar. Fig. 9 is a detached plan of the connecting-bar, showing the method of reversing the motion; and Fig. 10 is a cross-section of the rack-frame.

Referring now to the drawings, A represents a cylinder of a steam-engine, by means of which and its piston-rod B the reciprocating motion of the racks is produced. The motive power may be other than steam; but as my device will doubtless be chiefly used in connection with a steam-engine it has seemed most convenient to illustrate it in connection with a steam-engine. A and B, however, represent any desired form or size of cylinder and piston-rod, respectively, and need not be further described.

At any desired distance from the cylinder A is attached to the piston-rod B the rack-frame C. The rack-frame is constructed of a solid casting of iron or other suitable metal, and is of the form shown in Figs. 6 and 10. Two parallel racks, $a\ a'$, constitute the important feature of this frame. The teeth should be a distance apart equal to a little more than the diameter of the wheel in whose teeth they work—that is, the distance from the base of a tooth upon one rack to the base of the corresponding tooth upon the opposite rack should be a little more than the length of one of the teeth plus the diameter of the wheel. The teeth in one rack should be directly opposite those of the other rack, and their number should equal at least those of the wheel. In the drawings they are shown as equal in number to the teeth of the wheel. The length of each rack should be at least that of the stroke of the engine or one portion of the reciprocating motion. The width of the racks is preferably nearly equal to the diameter of the wheel, and the thickness at the center is about three times that at the edges. These proportions, however, may be varied from to quite an extent without danger. While the racks themselves are parallel the portion of the frame connecting them is curved, as shown in the drawings. The rack-frame should be so constructed as to weigh as little as is consistent with the strength requisite to resist the strains to which it may be subjected. Therefore the portion of the frame marked U, Fig. 10, is of a thickness at the center three times as great as at the outer edges. The portion marked T appears to be a flange upon the frame, having a thickness about one-sixth the width of the racks, except the portion described as sleeves. The flange T is surmounted by cylindrical borders V V, having a diameter about twice that of the thickness of the flange T.

The rack-frame C is provided at each end with sleeves D D', through which pass the cross-heads M and N, by means of which it is hung upon the supporting-rods. At the end toward the piston-rod B a portion of the sleeve D is cut away to provide for the admission of the sleeve E, which is attached to the piston-rod B by means of the key $b$. The sleeve E is preferably of cast-steel.

G and G' are supporting-rods of steel or other metal, attached at one extremity to the head of the cylinder through apertures in which they pass, and are held in position by means of nuts. At the other extremity G may be firmly attached in any convenient manner to the end of the engine-bed, while the other supporting-rod, G', passes through an eye in the rest H and is held in position by nuts.

The rest H, which is constructed of iron or other metal, is bolted to the engine-bed I, and may be of any convenient form; or, if desired, the rest H and the engine-bed I may be cast in one piece.

When it is convenient to place the rack-frame C at a great distance from the cylinder A, a rest similar to H may be constructed between the cylinder and the rack-frame, to which the supporting-rods at the inner end may be attached. It is advisable also to place another rest, J, upon the engine-bed directly under the engine-shaft. This rest is bored to permit the passage of the supporting-rod G. The supporting rods G and G' pass also through the cross-heads M and N. The cross-heads M and N should be constructed of steel or other metal. They are pierced at the bottom and top to permit the passage of the supporting-rods G and G', with which they form a sliding connection. They also pass through the sleeves D and D' and E.

Cast in the center of the rack-frame (upon the upper side, as shown in the drawings) is a pin, $c$, projecting above the rack-frame a distance equal to the sum of the length of a tooth upon the rack and the thickness of the shifting-bar. Over this pin is placed the shifting-bar K, which at its center is pierced with an aperture, $d$, of a size to permit the passage of the pin $c$, which should closely fit the aperture $d$. The shifting-bar K is a thin flat bar of steel of a thickness sufficient only to secure proper strength and rigidity, having its greatest breadth at its center and its ends. This greatest breadth should be about two-thirds the breadth of the racks. Its length is slightly less than the distance between the sleeves D and D'.

Bolted to the under side of the shifting-bar K by bolts $e\ e'$ at each extremity of the bar are loops $f\ f'$, Fig. 4, which pass through slots $g\ g'$ in the rack-frame C. These loops $f f'$ are constructed, preferably, of brass, and upon their lower sides form incline planes sloping in opposite directions. Attached by the same bolts, $e\ e'$, are loops $h\ h'$ above the shifting-bar K, through which passes the supporting-rod G'. These loops $h\ h'$ are of a height sufficient only to permit the free passage over the supporting-rod, and at the upper corners $l\ l'$ are curved to form small pockets, by which the shifting-bar K will be retained with some degree of firmness in position upon the supporting-rod G' until a force greater than the weight of the rack-frame or than that of the jar of the machinery is exerted. The incline of the loops $f f'$ is slightly greater than the length of one of the teeth of the rack. For convenience in attaching the loops $f f'' h h'$ to the shifting-bar K there may be cast upon the upper and lower sides of the ends of the bar lugs $m\ n$.

P is a connecting-bar (shown more particularly in Fig. 9) constructed of steel, slightly curved at its two extremities, which are supported by its eyes $p$ and $q$, which permit its passage upon the supporting-rod G'. The eyes $p$ and $q$ should be lined with gun-metal boxing. The connecting-bar P is attached to the shifting-bar K by means of a guide, $t$, Fig. 3. The guide $t$ is constructed of steel in the form of a half-circle, and is attached to the shifting-bar K by means of shoulders and nuts at each extremity. It passes through the connecting-bar P at the eye $u$, and by means of this connection holds the connecting-bar P rigidly in position with the shifting-bar K.

The supporting-rod G' is threaded for a short distance upon either side of a point directly above the engine-shaft, and nuts $r$ and $s$, forming stops, are screwed thereon at equal distances from the center. This form of construction is preferred in order that there may be a suitable adjustment of the stops, which, however, in practice will not be more than from one to two inches apart.

Below the supporting-rod G, through an extension of the cross-head M, when my device is connected with a steam-engine, moves an additional rod, R, which also passes through an eye in the rest J. This rod R is connected by any suitable lever with the valves of the cylinder A, and automatically operates the valves for the admission and emission of steam to and from the cylinder A by means of the stops $x$ and $y$, which are metallic projections upon the rod R or nuts working upon threads of the rod R, and which are adjusted to operate the valves at the proper moments as they are moved by the cross-head M. As this automatic method of operating the valves may be employed with many well-known forms of valves, a more particular description is not deemed necessary here.

The toothed wheel S is fastened upon the engine-shaft $z$ by means of the key $w$, and is so arranged that the teeth of the wheel may engage with the teeth of the parallel racks $a$ $a'$. There should always be an even number of teeth upon the wheel. The wheel may be arranged either at one end of the shaft or at any point between the ends of the shaft, as may be desired. It is thought best that the engine-shaft should be supported upon both sides of the wheel by ordinary journals built from the engine-bed when the wheel is not at one end of the shaft, and by one journal when the wheel is at the end of its shaft.

The construction of the cross-heads M and N is shown more in detail in Fig. 5, which represents a longitudinal section of one end of one of these cross-heads. The portion of the cross-heads passing through the sleeves of the rack-frame C is constructed of steel or other suitable metal. Just beyond the points at which they emerge from the sleeves D and D' of the rack-frame threads are cut upon them and hollow tubes of gun-metal, $x^2$, are secured thereon. These tubes $x^2$ are pierced to permit the passage of the cross-heads upon their supporting-rods G G'. The hollow tubes are also provided with a removable screw-cap, $y^2$, in order to permit the insertion of oil or other lubricant. The hollow space inside the tube may be filled with cotton, cotton waste, or other suitable box-packing, $z^2$. A small passage, $w^2$, is also bored through the remainder of the cross-head, so that the lubricant may pass from the upper portion of the cross-head to the lower.

The operation of my device is as follows: When the piston-rod B is completely within the cylinder A and a new stroke is about to commence, if the connecting-bar P is on the side of the supporting-rod shown in Fig. 2 the teeth of the wheel S will be engaged with the teeth of the lower rack. As the piston and the piston-rod proceed upon the outward stroke, carrying with them the rack-frame C, the teeth $a$ of the lower rack will successively engage the teeth of the wheel S until the completion of this portion of the reciprocating movement. When this portion of the movement is about completed, the eye $p$ of the connecting-bar P will come in contact with the stop $r$, and the pressure thus exerted upon the shifting-bar K, which forms a lever of the first kind, having the pin $c$ for a fulcrum, will cause the long arm to move rapidly in the opposite direction, and thereby the loops $f$ and $f'$ move rapidly through the slots $g$ $g'$ of the rack-frame C, and as these loops form incline planes the rack-frame moves until the teeth $a'$ are engaged with the teeth of the wheel S. As this movement has occupied only an instant of time, and as at the same instant the opposite portion of the reciprocating movement commences, the engagement of the teeth of the rack with the teeth of the wheel is practically continuous, and the revolution of the wheel is continued in the same direction as before without any perceptible check. In order that there may be a complete connection of the gearing during this change of position of the rack-frame without any interference caused by the points of the teeth upon the rack meeting the point of the teeth upon the wheel, there should be an even number of teeth upon the wheel, as before stated. At the completion of the second portion of the reciprocating movement the other extremity of the connecting-bar P will come in contact with the stop $s$, and the movement of the shifting-bar K will result in the rack-frame ascending the incline of the loops $f$ and $f'$, and the teeth of the lower rack, $a$, will engage with the teeth of the wheel S. As this automatic change of gearing between the parallel racks and the wheel will thus take place at the completion of each portion of the reciprocating movement, it is apparent that the wheel will continue to revolve in the same direction so long as the reciprocating motion continues. Should it be desired to reverse the motion, it is only necessary to move the connecting-bar P by its handle $v$ over the guide $t$ to the other side of the shifting-bar K. If this change is made during one portion of the reciprocating movements, when the end of this portion of the movement is reached there will be no change in the engagement of the teeth of the rack with the teeth of the wheel. The teeth of the same rack will engage the teeth of the wheel during the opposite movement, and, necessarily, the wheel must revolve in the opposite direction; but at the end of this portion of the movement the racks will be shifted, so that the new direction of revolution of the wheel will continue so long as the actuating force of the machinery is continued, or until the position of the connecting-bar P is again changed.

When my device is used with a steam-engine, two or more cylinders, piston-rods, and rack-frames may be used together, working upon two or more wheels upon the same shaft. In such case, if it is arranged that the strokes of the two piston-rods are not simultaneous, there can be no interval of time, even of the shortest possible duration, when motive power is not utilized, and the motion of the wheels and their shaft and the rest of the machinery will be perfectly steady.

Having fully described my invention, what I claim, and desire to secure by Letters Patent of the United States, is—

1. In machinery for converting reciprocating into rotary motion or the opposite, in combination with the body moving with a reciprocating motion, a rack-frame supported upon incline planes and containing two parallel racks so arranged that the rack-frame automatically ascends and descends the incline planes at the termination of each portion of the reciprocating motion, and the teeth of one rack engage with the teeth of a wheel during one portion of the reciprocating movement, and the teeth of the other rack engage with the teeth of the same wheel during the opposite movement, substantially as described.

2. In mechanism for converting reciprocating into rotary motion or the reverse, the combination, with a rack-frame having parallel racks, of a shifting-bar supported upon one of the supporting-rods upon which move the rack-frame and the shifting-bar, and also resting upon a projecting pin from the rack-frame, and also at its two extremities attached to the rack-frame by loops forming inclined planes, so constructed that when the rack-frame is at the upper portion of the loops one of the racks engages with the wheel to which or from which motion is to be transmitted, and when the rack-frame rests at the lower portion of the loops the opposite rack engages with the same wheel, substantially as set forth.

3. In machinery for converting reciprocating motion into rotary motion or the opposite, the combination of the piston-rod B, the rack-frame C, the racks $a$ $a'$, the shifting-bar K, the loops $h$ $h'$, the supporting-rod G', the loops $f$ $f'$, and the wheel S, substantially as set forth.

4. In a device for converting reciprocating into rotary motion or the opposite, the combination of a shifting-bar supported at its center upon a pin extending from a rack-frame and at its extremities attached to the rack-frame by loops which form incline planes, with a connecting-bar whose extremities form a sliding connection with the supporting-rod, over which it moves freely until checked by nuts screwed at desired points upon the supporting-rod, and attached at its center by a guide to the shifting-bar, substantially as set forth.

5. In mechanism for converting reciprocating into rotary motion or the reverse, the combination of the reciprocating body B, the rack-frame C, the racks $a$ $a'$, the wheel S, the shifting-bar K, the pin $c$, the loops $h$ $h'$ $f$ $f'$, the connecting-bar P, with its guide $t$, the eyes $p$ $q$, and the stops $r$ and $s$, substantially as set forth.

6. In mechanism for converting reciprocating into rotary motion or the opposite, in combination with a toothed wheel upon a driving-shaft, a rack-frame attached to the reciprocating body, consisting, essentially, of two parallel racks which, alternately with the change of the reciprocating movement, engage the teeth of the wheel, sleeves at its two extremities through which pass cross-heads by which it is attached to supporting-rods along which it moves, and a flange surrounding the racks, with means for automatically raising and lowering the rack-frame, substantially as set forth.

In testimony whereof I have hereunto set my hand and seal in the presence of two subscribing witnesses.

RICHARD L. AYER. [L. S.]

Witnesses:
CHESTER W. MERRILL,
DAVID DAVIS.